United States Patent
Wixey (10) Patent No.: US 10,399,198 B2
(45) Date of Patent: Sep. 3, 2019

(54) DRILL PRESS LASER ALIGNMENT DEVICE

(71) Applicant: Barry Douglas Wixey, Sanibel, FL (US)

(72) Inventor: Barry Douglas Wixey, Sanibel, FL (US)

(*) Notice: Subject to any disclaimer, the term of this patent is extended or adjusted under 35 U.S.C. 154(b) by 231 days.

(21) Appl. No.: 15/472,574

(22) Filed: Mar. 29, 2017

(65) Prior Publication Data

US 2017/0282321 A1    Oct. 5, 2017

Related U.S. Application Data (60) Provisional application No. 62/390,432, filed on Mar. 29, 2016.

(51) Int. Cl.
   *B23Q 17/24* (2006.01)
   *B23B 49/00* (2006.01)

(52) U.S. Cl.
   CPC .......... *B23Q 17/2423* (2013.01); *B23B 49/00* (2013.01); *B23B 2260/092* (2013.01)

(58) Field of Classification Search
   CPC .... B27C 1/14; B27C 1/04; B27C 1/12; B27C 5/02; B27C 5/04; B27C 7/02; B23Q 17/22; B23Q 11/0046; B23Q 16/006
   USPC .......................................................... 33/638
   See application file for complete search history.

(56) References Cited

U.S. PATENT DOCUMENTS

| | | | | |
|---|---|---|---|---|
| 9,114,494 B1 * | 8/2015 | Mah | ................... | B23Q 17/2233 |
| 9,630,336 B2 * | 4/2017 | Schnell | ................... | B27C 5/10 |
| 2006/0104731 A1 * | 5/2006 | Etter | ................... | B23B 39/00 |
| | | | | 408/16 |
| 2006/0111809 A1 * | 5/2006 | Etter | ................... | G05B 19/409 |
| | | | | 700/180 |
| 2006/0112581 A1 * | 6/2006 | Nortmann | ................... | B23D 59/002 |
| | | | | 33/638 |
| 2007/0217878 A1 * | 9/2007 | Byrd | ................... | B25H 1/0078 |
| | | | | 408/16 |
| 2008/0173147 A1 * | 7/2008 | Kovarik | ................... | B23D 59/001 |
| | | | | 83/62 |
| 2011/0197458 A1 * | 8/2011 | Karrar | ................... | B23D 59/002 |
| | | | | 30/383 |
| 2013/0240088 A1 * | 9/2013 | Schnell | ................... | B27C 5/10 |
| | | | | 144/154.5 |
| 2013/0287508 A1 * | 10/2013 | Timmons | ................... | B23Q 17/2404 |
| | | | | 408/16 |
| 2014/0379136 A1 * | 12/2014 | Schlegel | ................... | B25B 21/00 |
| | | | | 700/275 |
| 2017/0282321 A1 * | 10/2017 | Wixey | ................... | B23Q 17/2423 |

* cited by examiner

*Primary Examiner* — Yaritza Guadalupe-McCall
(74) *Attorney, Agent, or Firm* — William E. Noonan (57) ABSTRACT

A drill press laser alignment device includes a rigid plate that is attachable to the column of the drill press above the table. A plurality of cylindrical support posts carried by the plate engage the column to fixedly orient the plate relative to the table. A pair of laser modules mounted rotatably to the plate produce respective planar laser beams that are projected perpendicularly against the table such that the beam appears as a laser line on the table. The laser modules are manipulated to produce a laser crosshair alignment marking wherein the projected laser lines intersect at a point operatively aligned with the axis of the drill bit. This forms a target for accurately positioning a workpiece to be drilled on the table below the drill bit.

19 Claims, 10 Drawing Sheets

DRILL PRESS LASER ALIGNMENT DEVICE

RELATED APPLICATION

This application claims the benefit of U.S. Provisional Application Ser. No. 62/390,432 filed Mar. 29, 2016.

FIELD OF THE INVENTION

This invention relates to a laser alignment device for use on a drill press. More particularly, the device relates to a crosshair generating attachment that may be quickly, conveniently and reliably attached to and used with a drill press not previously equipped with laser positioning capability.

BACKGROUND OF THE INVENTION

Many conventional drill presses include integral laser alignment systems that are installed at the factory when the drill press is manufactured. Such systems generate a laser crosshair that is aligned with the drill bit of the machine so that a hole may be more accurately drilled in a workpiece mounted on the drill press. Although such built-in laser alignment systems are generally accurate and easy to adjust, repairing and/or replacing them can be complicated and expensive because the alignment system is integrated with the drill press. Moreover, many older, simpler and/or less sophisticated drill press machines lack any type of laser alignment system whatsoever.

A number of aftermarket, add on and attachment laser kits have been introduced for drill presses. However, these products tend to exhibit various shortcomings. They are generally fairly flimsy and can be difficult to adjust so that the laser crosshair is accurately aligned with the drill bit. In most cases, the drill press operator must perform repeated intermittent adjustments of the system to obtain an accurate laser crosshair. Between each adjustment, the operator must inspect accuracy of the crosshair and perform additional fine tuning adjustments if needed. This can be extremely time consuming and tedious. In addition, it can be difficult to maintain the laser crosshairs at an accurate drill bit alignment when the height of the drill press table or workpiece is changed. The accuracy of conventional add-on or aftermarket laser alignment systems also tends to be easily disrupted when the drill press is operated and machine vibrations are transmitted to the laser attachment. The laser crosshairs are apt to drift off-center. The relatively flimsy, non-rugged construction of most existing products contributes to this problem. In addition, conventional aftermarket laser systems are not optimally universal and cannot be used with all drill presses.

SUMMARY OF THE INVENTION

It is therefore an object of the present invention to provide an improved drill press laser alignment device, which may be quickly and easily installed on virtually all types and models of drill presses to provide accurate alignment of the drill bit with the proper spot to be drilled on a supported workpiece.

It is a further object of this invention to provide a drill press laser alignment device that is particularly designed and intended to be attached or added to an existing drill press as an aftermarket product and which is more rugged, accurate and easier to install and use than previous drill press laser alignment attachments.

It is a further object of this invention to provide a drill press laser alignment device that is quickly and easily adjusted to align with the center of a drill chuck and attached drill bit and which does not require tedious and time consuming intermittent adjustments to produce an accurate laser alignment crosshair.

It is a further object of this invention to provide a drill press laser alignment device wherein the laser crosshairs remain reliably on center when the table height is changed and regardless of the thickness of the workpiece that is being drilled.

It is a further object of this invention to provide a drill press laser alignment device employing a rugged and vibration-resistant construction that enables the device to withstand drill press vibrations and continue to provide accurate alignment information during operation of the drill press.

It is a further object of this invention to provide a drill press laser alignment device that is extremely durable and withstands long term and heavy machine use while maintaining alignment accuracy and resisting disruption and drifting of the laser crosshairs generated by the device.

It is a further object of this invention to provide a drill press laser alignment device that employs a structure that fastens the device securely, yet releasably to virtually all drill presses so that consistent and accurate laser alignment is achieved and maintained.

This invention features a laser alignment device for use on a drill press, which drill press includes a workpiece supporting table and a vertical column that supports a drill head and a drill bit operated by the drill head above the table. The alignment device includes a base attachable to the column of the drill press above the table. A plurality of support posts are carried by the base for engaging the column of the drill press when the base is attached to the column to fixedly orient the base relative to the table of the drill press. A pair of laser modules are mounted rotatably to the base. Each laser module produces a substantially planar laser beam, which is projected substantially perpendicularly against a target surface defined by at least one of the table and a workpiece positioned on the table such that the laser beam appears as a laser line on the target surface. The laser modules are rotated to form a laser alignment crosshair marking on the target surface wherein the laser lines projected by the respective laser modules intersect at a point operatively aligned with an axis of the drill bit. The laser alignment crosshair marking forms a drilling target for accurately positioning a workpiece to be drilled on the table below the drill bit.

In a preferred embodiment, the base includes a rigid plate, which may have substantially flat upper and lower surfaces. The plate may include a concave recess for receiving and engaging the column of the drill press when the base is attached to the column. One or more of the support posts may include a generally cylindrical component attached and extending perpendicularly to the plate.

The device may further include a clamp for attaching the plate to the column. The clamp has a length-adjustable elongate strap for encircling the column of the drill press and circumferentially engaging the support posts. The strap may attach to itself and the clamp may include a device for adjusting the length of the strap to selectively tighten the strap when the strap encircles the column and circumferentially engages the support posts. Each cylindrical component may include a circumferential recess for receiving the strap such that the strap securely interengages the cylindrical components to attach the plate to the column.

One or both of the laser modules may include an outer boss mounted rotatably in a corresponding vertical opening formed through the base. The boss may have a central channel formed therethrough for accommodating a laser element therein. The laser module may further include a saddle pivotally mounted in the central channel of the boss and having an interior chamber for holding the laser element. A clearance gap may be formed between the central channel of the boss and the saddle to permit the saddle to pivot within the boss. The boss and the saddle may have respective bottom ends that define a hole for projecting the planar laser beam therefrom. A lower end of the saddle may extend through a bottom of the boss and a narrow window slot may be formed through the lower end of the saddle for projecting the planar laser beam from the laser module.

The laser module may include laterally opposing first and second compartments, each in communication with the central channel of the boss for respectively receiving a saddle adjustment element and a spring. An inner end of the saddle adjustment element may engage the saddle and the spring may extend between an interior wall of the boss and the saddle. An outer end of the first compartment may be open to provide access to an outer end of the adjustment element. This allows the saddle adjustment element to be moved selectively through the first compartment to engage and pivot the saddle within the channel against the spring and adjust the angle of the saddle and the laser element within the boss. This adjusts the resulting angle at which the laser beam is projected from the laser module. The adjustment element may be a set screw threadably and operably engaged with corresponding threads formed in the first compartment.

The base may include a groove extending partially about and adjacent to the vertical opening in the base and the boss may carry a tab received by the groove to limit rotation of the boss in the base. The boss may include a lower knob for rotating the boss to adjust the orientation of the laser line projected against the target surface.

A battery housing may be attached to the base for accommodating batteries that are operatively connected and provide power to the laser modules through connective wiring and an ON/OFF switch.

The plate may include a concave recess for receiving and engaging a column of the drill press when the base is attached to the column. Each generally cylindrical support post may be attached to the plate adjacent the respective end of the recess.

The saddle may include a pair of opposing pivot arms that fit in corresponding support pockets formed in the boss to pivotally mount the saddle in the channel of the boss. An upper end portion of the central channel may include an inwardly tapered opening between the top of the boss and the support pockets to facilitate introduction of the saddle into the boss. This strengthens the interconnection between the saddle and the boss.

BRIEF DESCRIPTION OF THE DRAWINGS

Other objects, features and advantages will occur from the following description of a preferred embodiment and the accompanying drawings, in which.

DETAILED DESCRIPTION OF PREFERRED EMBODIMENTS

Figure 1:
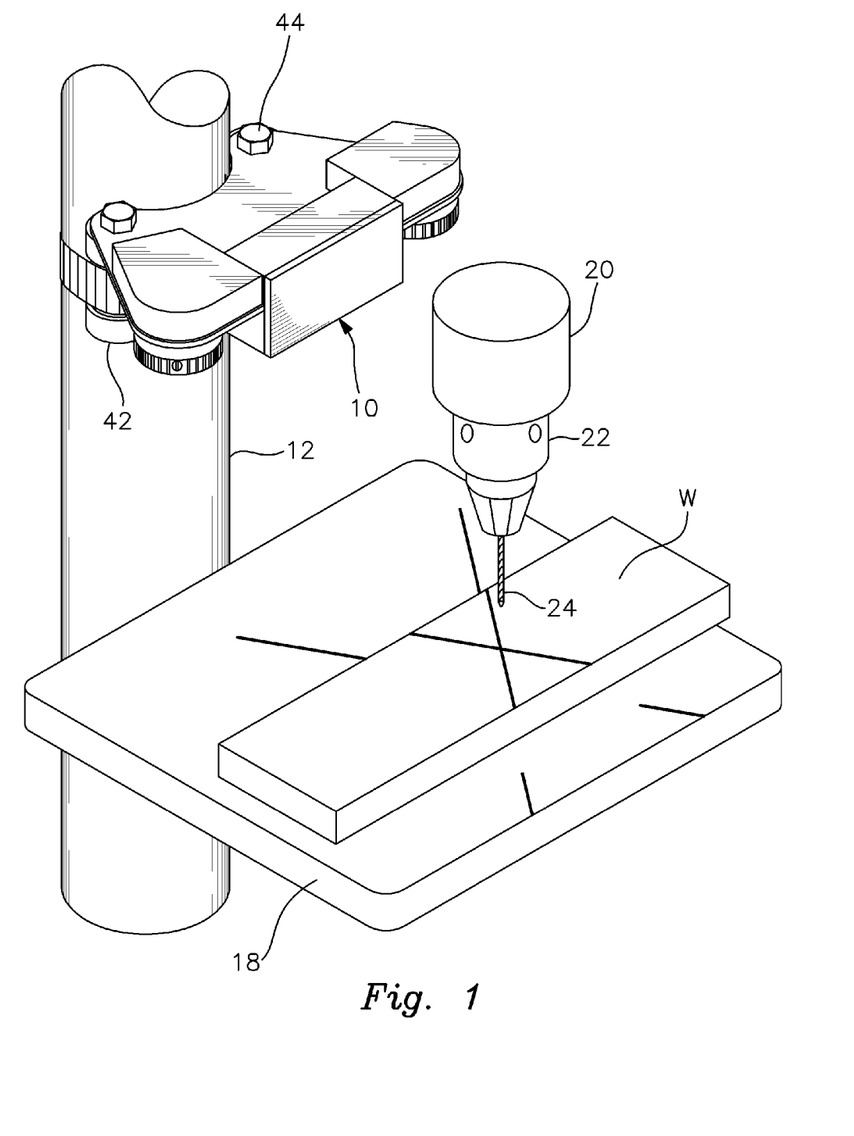
FIG. 1 is a perspective, partial view of a representative drill press to which the laser alignment device of this invention is operatively attached.
Figure 2:
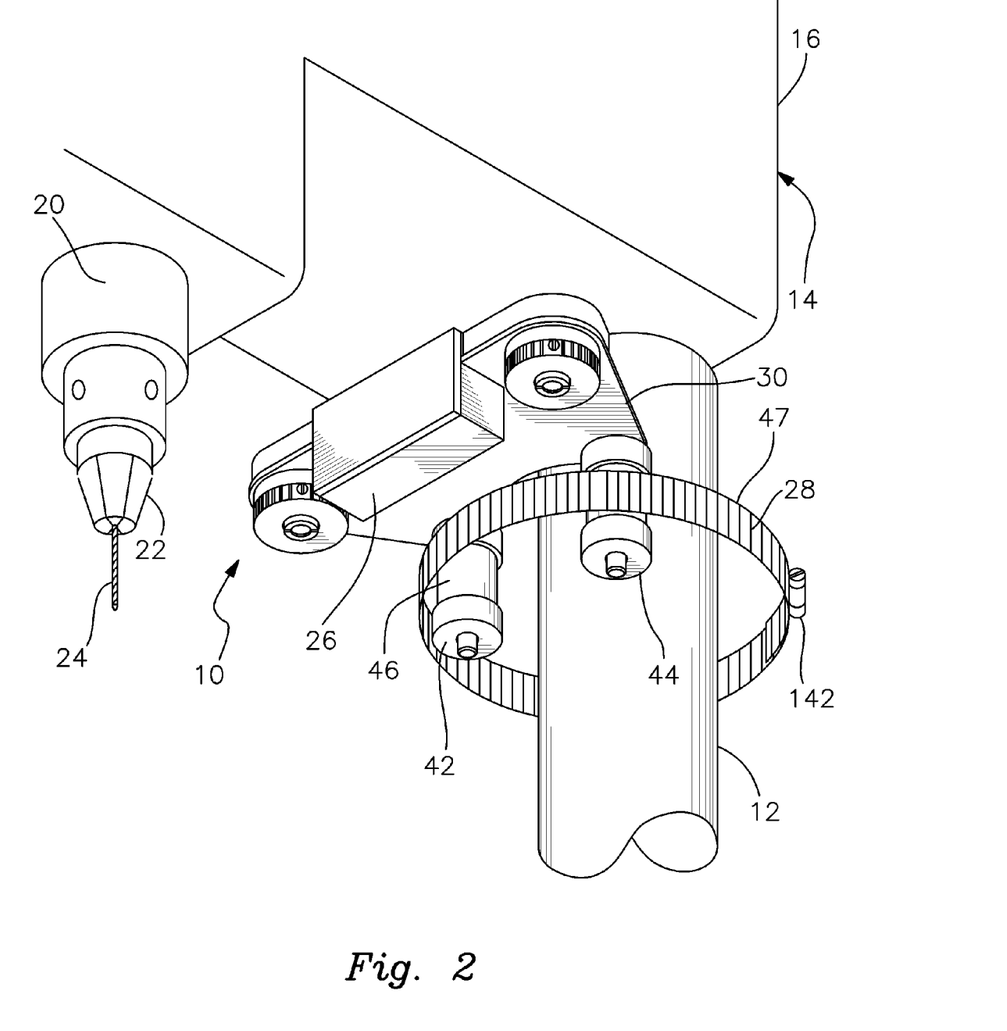
FIG. 2 is a lower perspective view of the laser alignment device attached to the column of a drill press and more particularly illustrating the preferred clamp for attaching the device to the column.

There is shown in FIGS. 1 and 2 a laser alignment device 10 operably attached to a column 12 of a drill press 14. As will be understood to persons skilled in the art, drill press 14, which is a conventional item and may include virtually any type or model of drill press, features an elongate, vertical column 12 supported on the floor of a shop or workspace in a known manner that is not shown herein. The drill press includes a drill head 16 supported by column 12 above a standard drill press table 18, FIG. 1. Again, table 18 may be interconnected to the column in various ways (typically height adjustable), which will be understood to persons skilled in the art.

Drill head 16 is operably interconnected to a spindle 20, FIG. 1, that in turn supports a drill chuck 22 and a drill bit 24, which may include a variety of selected diametric sizes required for drilling corresponding sizes of holes. Table 18 supports a workpiece W. In woodworking applications, workpiece W is typically composed of wood. However, the present invention is also applicable to drill presses used for forming holes in various other materials such as metals and plastics. In such applications, the workpiece will be composed of the material pertinent for that application. As used herein the term "workpiece" should be understood to refer not only to the place to be drilled, but also template and dummy pieces that are supported on table 18 for adjustment of device 10 as described below. Once again, the construction and operation of the various drill press components with which device 10 is used are conventional. Device 10 may be employed on virtually all types of drill presses used in various industries and locations (e.g. home or factory workshops) and for virtually any and all drilling applications.

Figure 3:
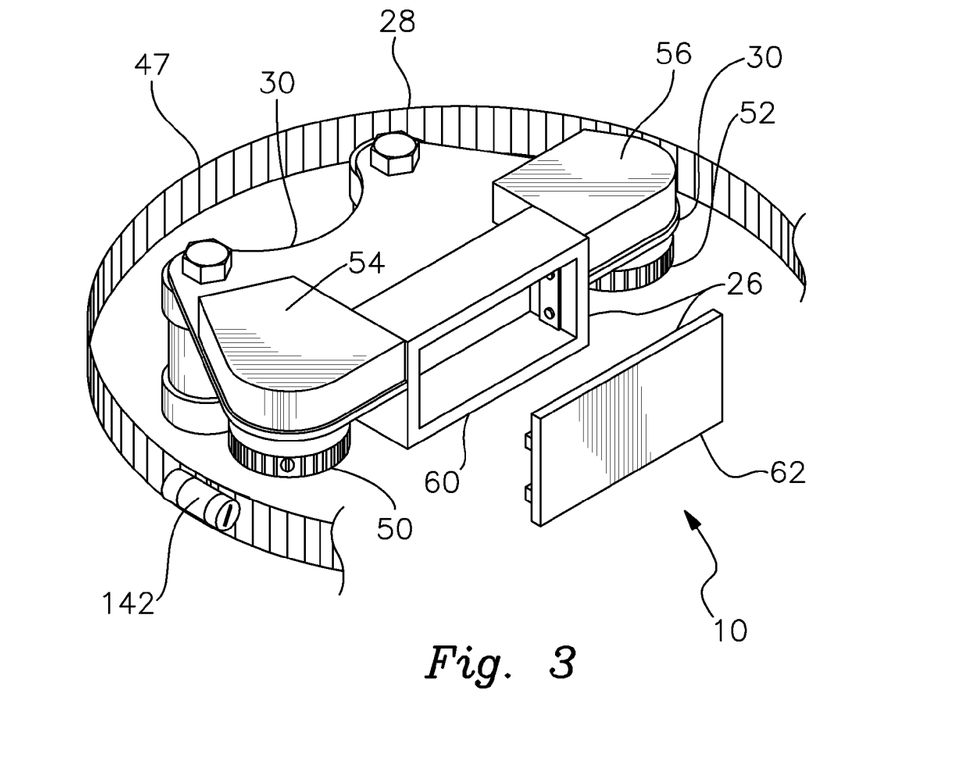
FIG. 3 is an upper perspective and partially exploded view of the laser alignment device with the battery cover removed to depict the battery power source for operating the laser modules.
Figure 4:
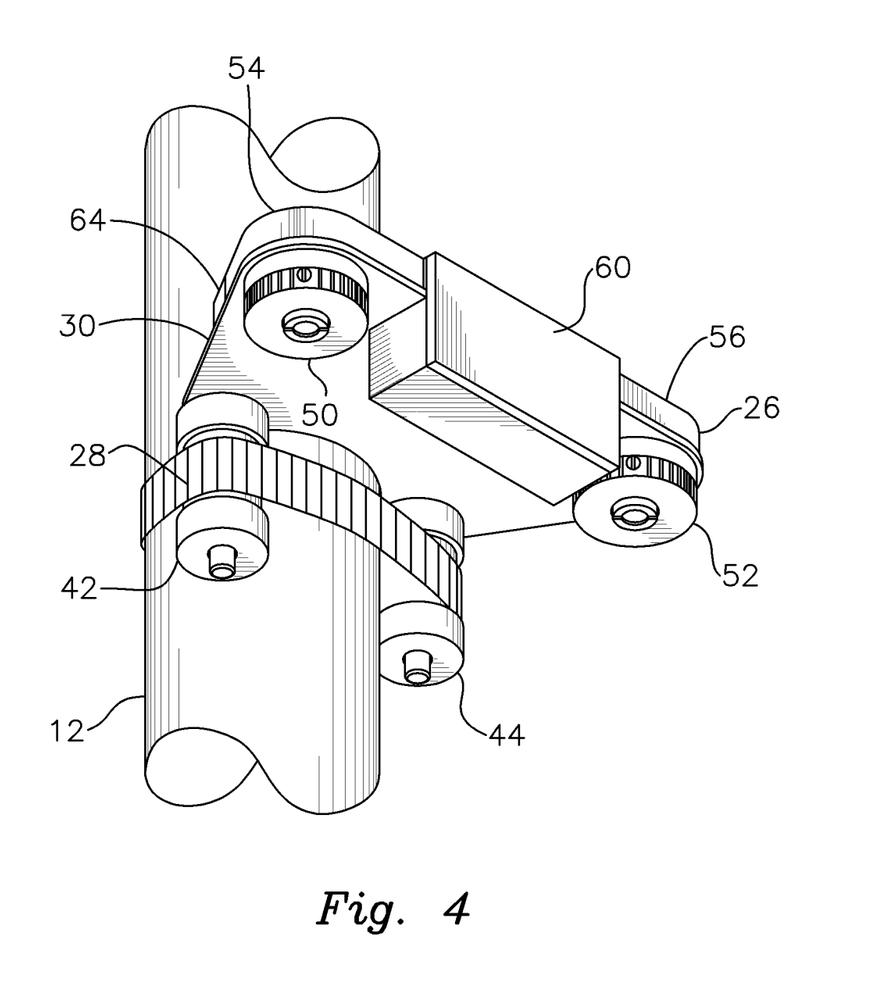
FIG. 4 is a lower perspective view of the device as attached to a column of the drill press.
Figure 5:
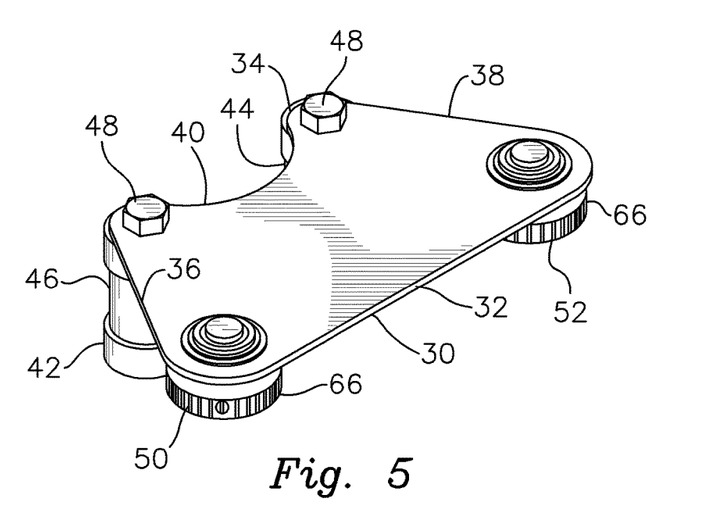
FIG. 5 is an upper perspective view of the mounting plate, and the support posts and laser modules attached thereto.
Figure 6:
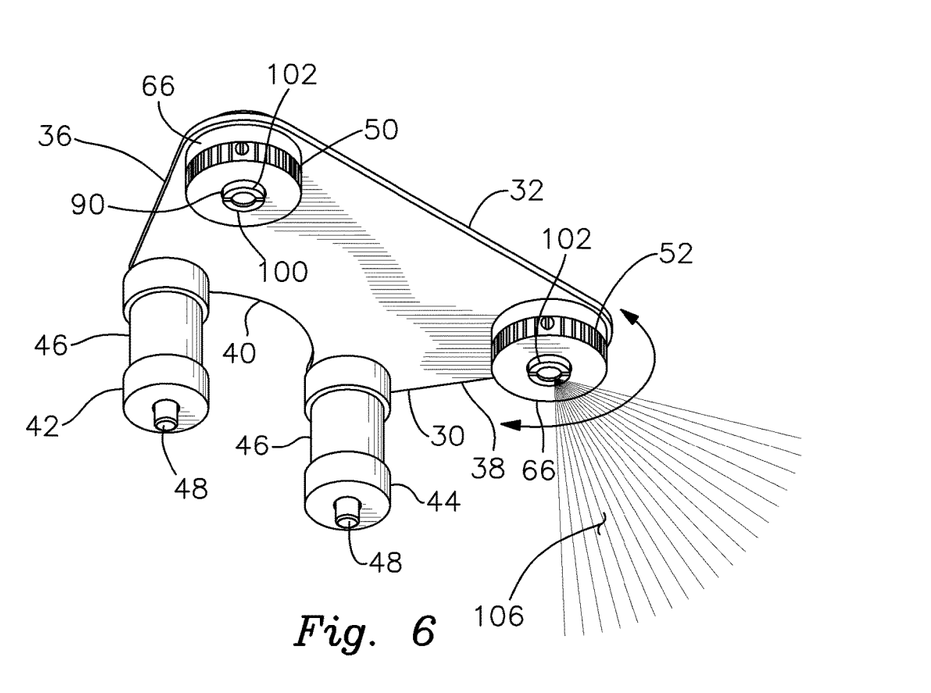
FIG. 6 is a lower perspective view of the mounting plate, support posts and laser modules with a representative planar laser beam being emitted from one of the modules.

Laser alignment device 10, which is shown alone in FIG. 3, includes an operating unit 26 and a hose clamp 28 for securing the operating unit to column 12 of drill press 14. More particularly, as best shown in FIGS. 3-6, operating unit 26 features a base comprising a generally flat plate 30 composed of a rigid material. Steel or other rigid metals or plastic materials may be utilized. Plate 30 has a relatively wide forward end 32 and a relatively narrow rearward end 34 which are joined by converging sides 36 and 38. A concave recess 40 is formed at rearward end 34. The function of recess 40 is described more fully below. As is best shown in FIGS. 5 and 6, both the upper and lower surfaces of plate 30 are substantially flat. Top to bottom holes are formed through the plate for mounting support posts and laser modules to plate 30 as will be described below. See, for example, hole 68 in FIG. 7.

As best shown in FIGS. 1, 2 and 4-6, a pair of generally cylindrical support posts 42 and 44 are carried by and depend from plate 30 proximate rearward end 34 of plate 30. Posts 40 and 42 are composed of aluminum or an alternative strong and rugged metal or plastic material. As used herein "cylindrical" means that the support posts are cylindrical for at least a portion of their respective lengths. In the version depicted herein, each cylindrical post includes a longitudinal, circumferentially cylindrical recess 46 which accommodates a strap 47, FIG. 2, in a manner described more fully below. Each of the cylindrical support posts 42 and 44 includes a threaded central opening for receiving a complementary bolt 48 (FIGS. 3 and 5) that extends through an obscured hole in plate 30 and threadably engages the support post to secure the support post to the plate. In the version shown in FIGS. 5 and 6, the respective fastening bolts 48 extend fully through and beneath posts 42 and 44. In alternative preferred embodiments, the threaded holes are formed only partially through the support posts and the attachment bolts do not extend through and beneath the posts. Each support post is positioned proximate a respective end of concave recess 40.

A pair of laser modules 50 and 52 are carried by plate 30 proximate forward end 32 of the plate. As best shown in FIGS. 3 and 4, each of control modules 50 and 52 is covered by an associated plastic box 54 and 58, respectively mounted on plate 30. These boxes accommodate standard wiring electrically connected to the laser modules. A battery compartment 60 (typically formed in one piece with the boxes) is likewise mounted onto plate 30 by conventional fastening means (e.g. screws, pins, etc.), which are not shown. Compartment 60 contains a pair of batteries (e.g. AA batteries) which are electrically connected to laser elements within laser modules 50 and 52 by wiring contained within boxes 54 and 56. The battery compartment communicates with the interior of boxes 52 and 52 to accommodate the wiring (not shown) that electrically interconnects the batteries and the laser modules. Battery compartment'60 is selectively closed by a cover 62, FIG. 3. As shown in FIG. 4, box 54 accommodates an ON/OFF switch 64, which is constructed and operated conventionally to selectively activate and deactivate the lasers as described below. Switch 64 may be provided with a standard auto shut-off.

Conventional add-on laser alignment systems for drill presses utilize batteries, switches and wiring for operating the lasers as will be understood by persons skilled in the art. The specific structural details of the battery compartment, boxes, power source, ON/OFF switch, and wiring are standard in the art and by themselves do not constitute a patentable aspect of this invention.

The preferred structure for laser modules 50 and 52 is depicted in FIGS. 5-10. More particularly, FIGS. 7-10 illustrate the structure of a representative one of the modules 50. It should be understood that laser module 52 employs a similar structure.

Figure 7:
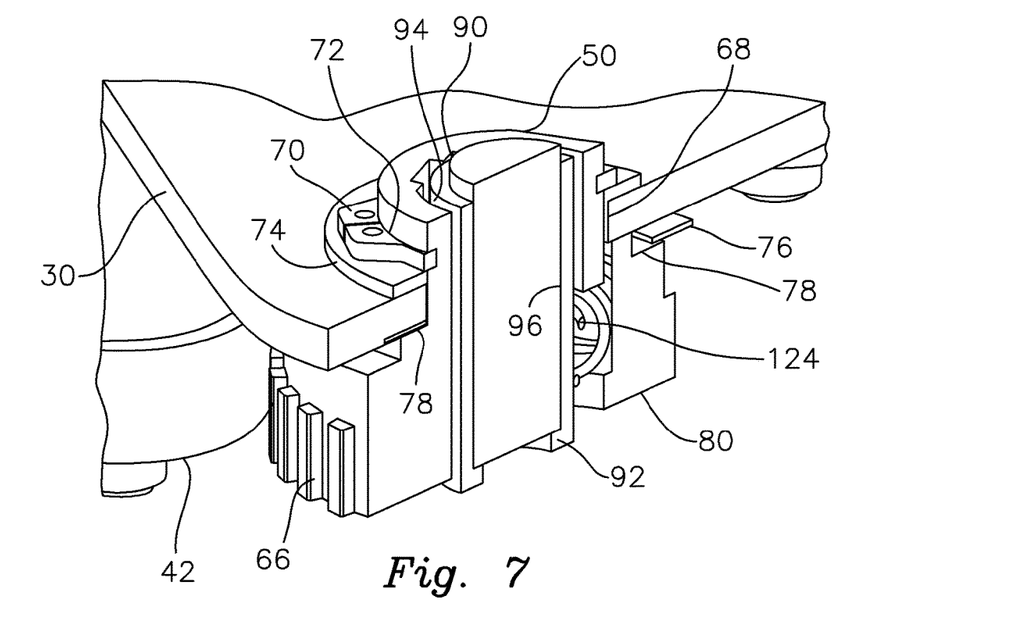
FIG. 7 is an upper perspective and cross sectional view of a representative one of the laser modules as carried by the mounting plate and with the upper housing or box containing the battery compartment, as well as the ON/OFF switch and wiring for powering the laser omitted for clarity.

Each laser module includes an outer boss 66 that is typically composed of a plastic material. Boss 66 fits through a respective opening 68 in plate 30, as best shown in FIG. 7. An upper snap ring 70 is fitted within a corresponding circumferential groove 72 proximate the upper end of boss 66. A shim washer 74 is interposed between snap ring 70 and the upper surface of plate 30. This spaces the snap ring from the upper surface of the plate to prevent scratching of the plate as the boss and laser module are rotated in the manner described below. A lower wave washer 76 is likewise interposed between a ledge 78 of boss 66 and the bottom of plate 30. This provides for a snug interengagement between the boss and the plate and sufficient friction so that a positive, but not undue turning force is required to rotate the boss within the plate. This snug frictional interengagement prevents the boss from loosely turning within its respective hole in the plate, which would not be desirable as it would not allow the laser modules to be held in a secure and accurate position following adjustment. Too loose a connection would allow the boss to turn too easily relative to the plate, particularly while the drill press is operating and vibrating, which would likely disrupt the proper location and alignment of the laser crosshair.

Figure 8:
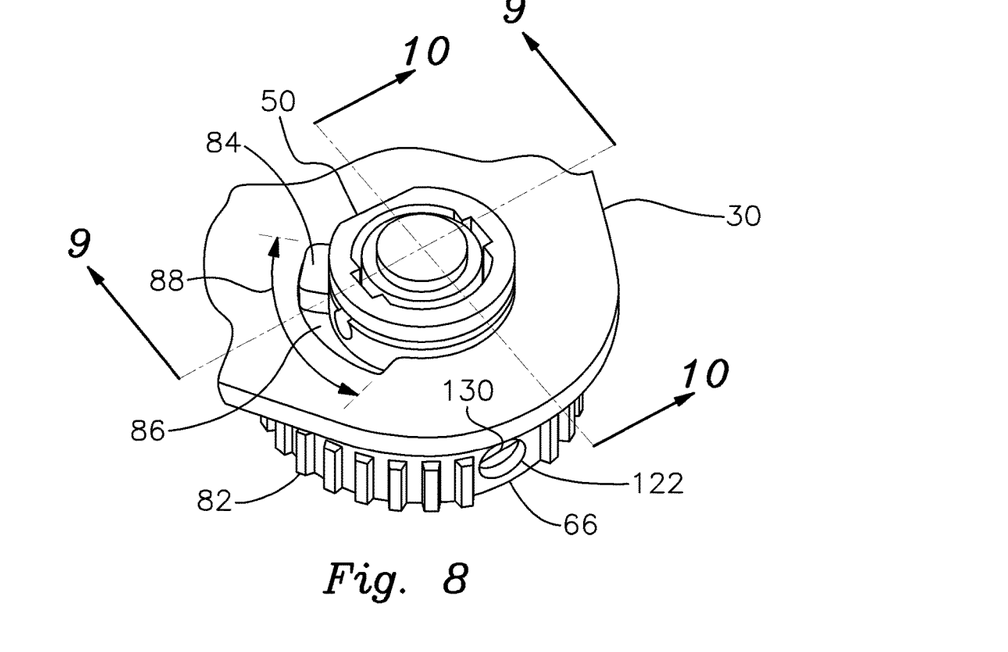
FIG. 8 is a top perspective view of the laser module as carried by the mounting plate and with the upper snap ring, washer and wiring/switch box omitted to depict the structure for limiting rotation of the module.

The lower end of boss 66 includes a relatively large diameter annular knob 80 that carries a series of longitudinal ribs 82. The ribs facilitate turning of the boss and the laser module within the mounting plate 30. Ribs 82 are typically formed integrally with the plastic boss. As further shown in FIG. 8, boss 66 carries a rotation-limiting tab 84 that fits within an arcuate groove 86 formed in plate 30. Groove 86 extends about the boss beneath shim washer 74 (FIG. 7). In FIG. 8 the shim washer is removed to depict the interrelationship of tab 84 and groove 86. The groove limits the degree to which the boss 66 can be turned within opening 68 of plate 30. The limits of such movement are depicted by double headed arrow 88 in FIG. 8.

Figure 9:
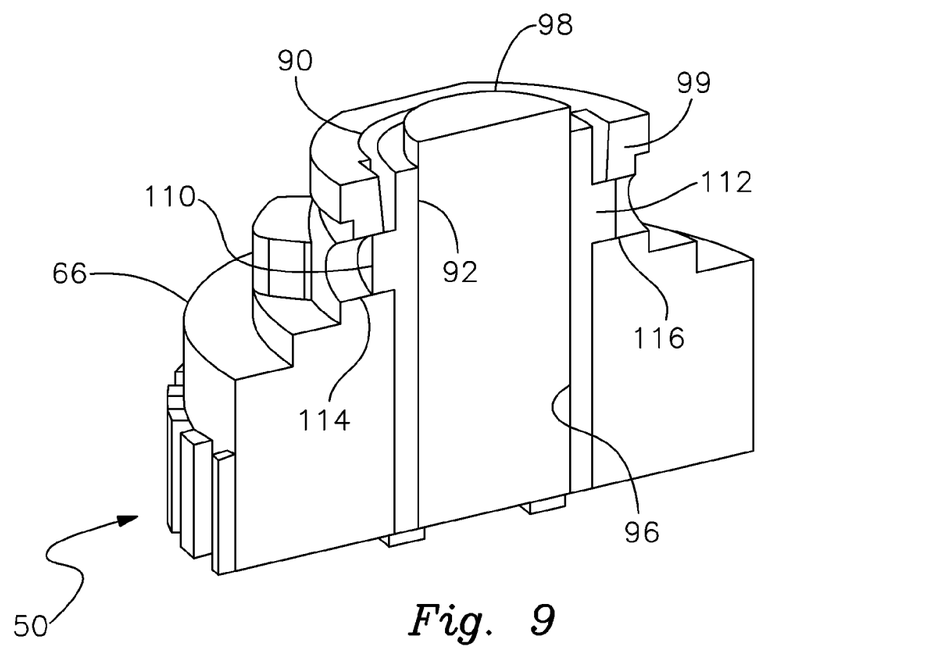
FIG. 9 is a perspective, cross sectional view of the laser module taken along line 9-9 of FIG. 8 and particularly depicting the means for pivotally mounting the saddle inside the central channel of the outer boss.
Figure 10:
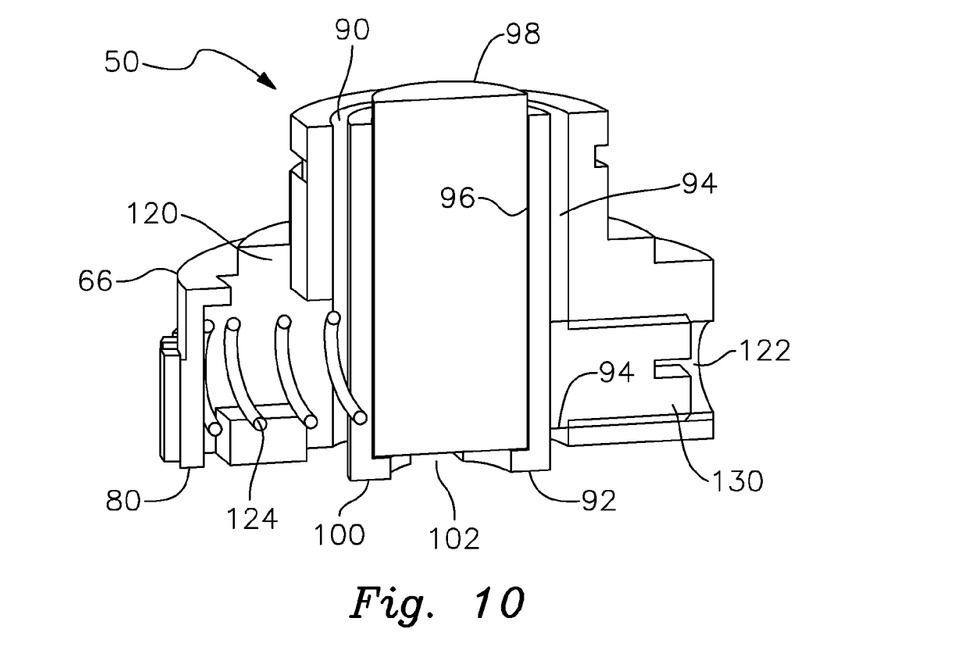
FIG. 10 is an alternative cross sectional view of the laser module taken along line 10-10 of FIG. 8, which depicts the set screw and spring for angularly adjusting the saddle and laser element.

As best shown in FIGS. 7, 9 and 10, boss 66 includes a central bore or channel 90 that extends vertically through the boss from top to bottom. Channel 90 receives an elongate and generally cylindrical plastic saddle 92. As shown in FIGS. 7 and 10, a clearance gap 94 is formed between the outside wall of saddle 92 and the inner wall of central opening 90 in boss 66. This allows the saddle to pivot within the central opening of the boss and is descried more fully below.

Saddle 92 itself includes an inner chamber 96 that accommodates an elongate laser element 98. Various conventional or standard types of laser elements may be employed within the scope of this invention. Each laser element has a power of approximately 2.3 mW, although various other powers may be employed within the scope of this invention. The interior chamber 96 of saddle 92 conforms closely to the cylindrical outer surface of laser 98 so that the laser element is held snugly within the saddle. A lower end 100 of saddle 92 protrudes from the bottom of boss 66 and more particularly protrudes outwardly from the open lower end of the central opening 90 formed through boss 66. See also FIG. 6. A narrow diametric slot 102 is formed in lower end 100 of saddle 92. The lower end of boss channel 90 and slot 102 in lower end 100 of saddle 92 thereby define a window for emitting a laser beam from the laser module and onto a target surface as described below. When laser element 98 is activated, a laser beam is projected from slot 102 as best shown in FIG. 6. Specifically, the laser module 50, 52 produces a substantially planar laser beam 106 that is emitted from the open lower end of the laser module and projected as a laser line on an underlying surface of the table or workpiece in the manner described below. Such a light beam is shown as being projected from laser module 52 in FIG. 6. An analogous beam is similarly produced by laser module 50.

As shown in FIG. 9, saddle 52 includes an opposing pair of radial pivot arms 110 and 112 that are received by respective pockets 114 and 116 formed in boss 66. As further shown in FIG. 10, each boss 66 includes a pair of generally opposing compartments 120 and 122. Compartment 120 contains a compression spring 124 that extends between an interior wall of annular portion 80 of boss 66 and an exterior surface of saddle 92. Compartment 122 accommodates and threadably interengages a set screw 130 (see also FIG. 8). This structure allows saddle 92 and accommodated laser 98 to be angularly adjusted within central channel 90 of boss 66. In particular, the user accesses set screw 130 with a flat blade screwdriver and turns the screw as required to move it either inwardly or outwardly through compartment 122. When the set screw is advanced within compartment 122, saddle 92 pivots on arms 110 and 112 such that spring 124 is compressed. The angle of the saddle may be adjusted in an opposite direction by loosening set screw 130 with compartment 122. This causes this spring to expand and pivot saddle 92 and laser 98 in an opposite direction. The structure thereby allows the user to angularly adjust the beam emitted by the laser through slot 102 in order to accurately adjust the vertical or Z-plane of the light beam, as described below, so that an accurate crosshair alignment is achieved.

Saddle 92 and accommodated laser element 98 are installed into boss 66 by first inserting the lower end 100 of saddle 92 into the upper end of boss channel 90. The upper end of channel 90 includes an inwardly tapered entrance 99, FIG. 9, that expands as the saddle is pushed downwardly and longitudinally through channel 90. The tapered entry further expands and facilitates introduction of pivot arms 110 and 112 into the channel. The channel expands until the arms essentially snap into respective pockets 114 and 116. This holds the saddle securely within the central channel 90 but at the same time allows the saddle to freely pivot within the channel through the space created by clearance gap 94.

To install and operate device 10, a pair of AA batteries or an alternative power supply are installed in compartment 60 and cover 62 is attached to the battery compartment (see FIG. 3). Plate 30 is then interengaged with column 12 of drill press 14 in the manner best shown in FIGS. 2 and 4. Specifically, concave recess 40 of plate 30 is interengaged as closely as possible with the circumference of column 12 (which is typically cylindrical). Cylindrical support posts 40 and 42, which depend perpendicularly from plate 30, are engaged with the circumferential surface of column 12 such that the support posts are axially parallel to the column of the drill press and axially perpendicular to the underlying table 18 of the drill press. Clamp 28, which preferably comprises a standard hose clamp including an elongate strap 47, FIGS. 2 and 3, and a length adjusting hose clamp screw 142 are manipulated and positioned such that strap 47 encircles support posts 42 and 44 engaged against column 12. See FIG. 2. Strap 47 of clamp 28 is inserted into circumferential recesses 46 of posts 42 and 44 and length-adjusting screw 142 is operated to tighten the strap about the column 12 sand support posts 40 and 42. The clamp is tightened until the mounting plate and support posts are tightly and securely attached to the drill press column. As a result, mounting plate 30 and the supported laser modules 50 and 52 are fixed securely to the column of the drill press. The lower ends of the laser modules are oriented to point generally parallel to the drill bit axis and perpendicularly downwardly toward the underlying table of the drill press.

After device 10 is attached to the drill press, the user is able to quickly, conveniently and accurately verify and, if necessary, adjust the laser so that it is aligned with the drill bit of the drill press. This is accomplished by adjusting one or both of the laser modules 50 and 52 rotatably (i.e. in an XY-plane across the table and, if applicable, the supported workpiece) and vertically (i.e. in a Z-plane). The XY-plane adjustment is accomplished by rotating the respective bosses 66 of the laser modules 50, 52 relative to mounting plate 30. The vertical or Z-plane adjustment is achieved by pivoting the saddles and supported lasers within their respective bosses.

Figure 11:
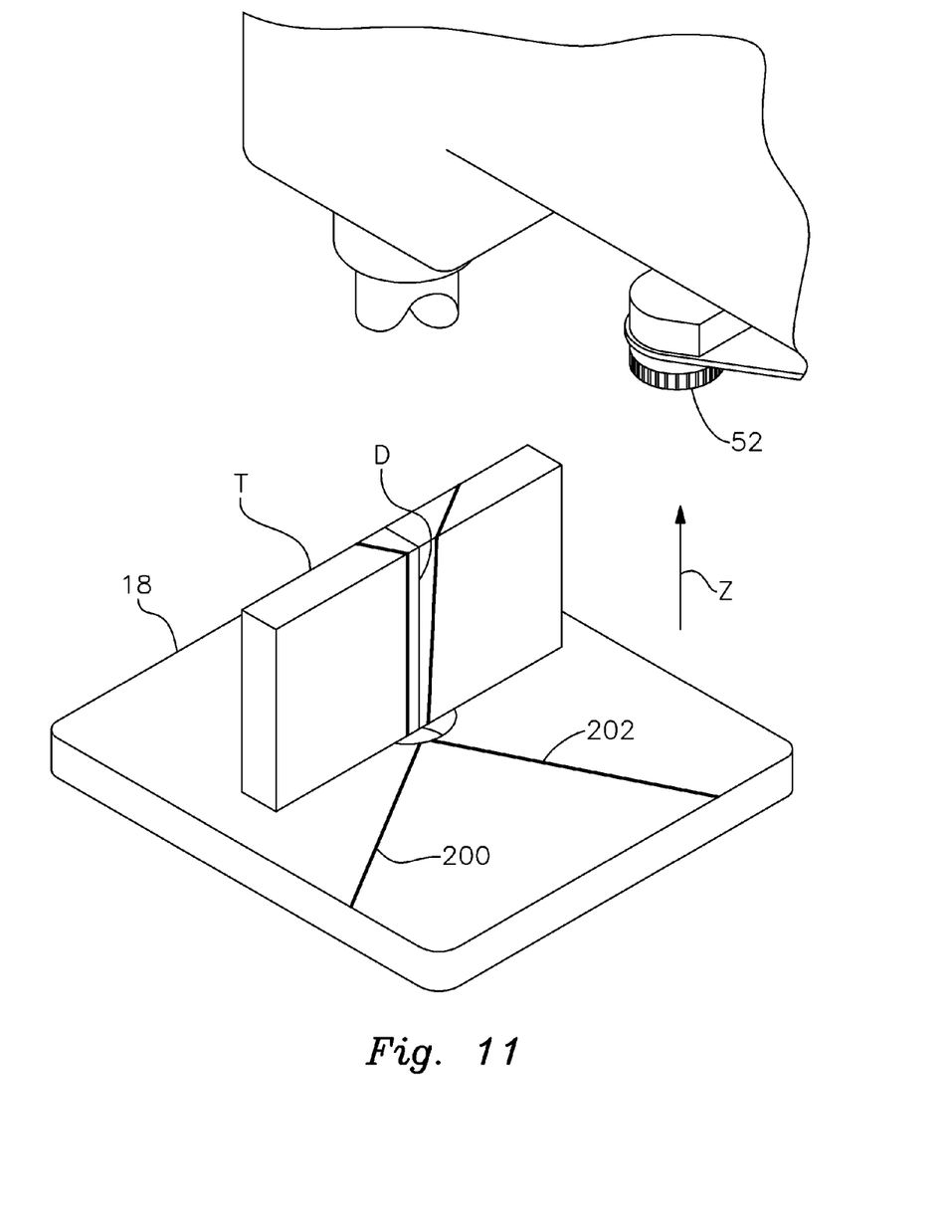
FIG. 11 is an upper perspective view illustrating the vertical or Z-axis adjustment of the laser lines to achieve an accurate laser crosshair marking.
Figure 12:
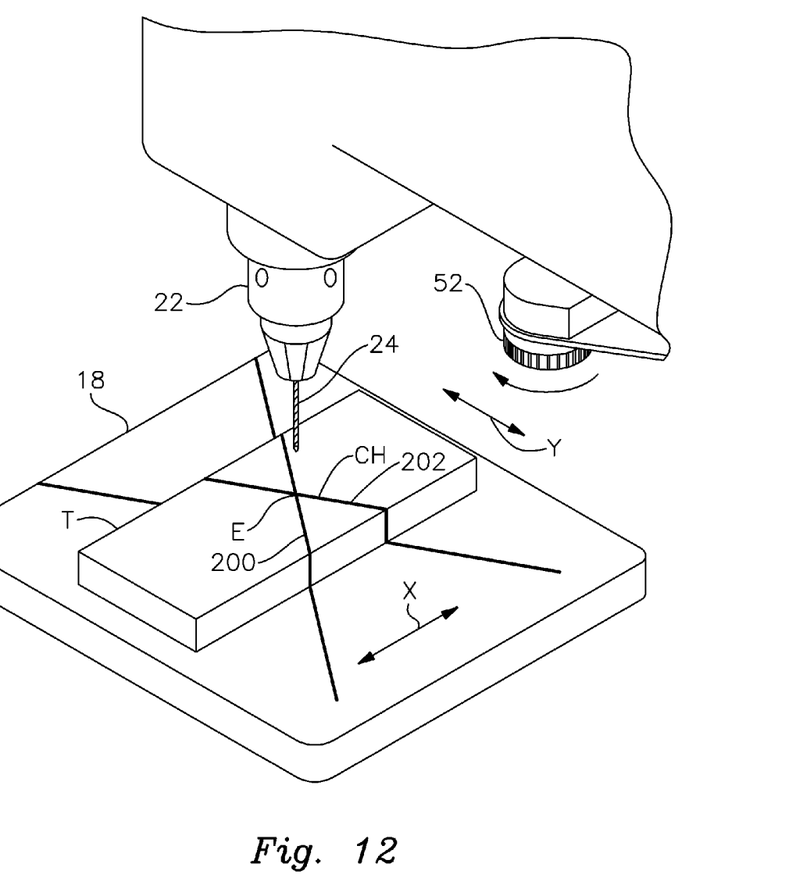
FIG. 12 is an upper perspective view of the laser modules being adjusted to form an XY-plane crosshair marking on a test workpiece that is accurately aligned with the axis of the drill bit.

A preferred manner for accurately adjusting the positioning of the laser modules to achieve accurate alignment with the drill bit is performed as follows. The laser modules 50 and 52 are activated by pressing ON/OFF button 64 shown in FIG. 4. This causes laser beams to be generated and emitted as planar beams from the lower ends of both laser modules as previously described. The beams are projected onto the underlying table 18 as laser lines. See for example lines 200 and 202 in FIG. 11. Each line typically has a thickness of about 0.33 mm. Alternative thicknesses may be exhibited within the scope of this invention. The drill press operator selects a piece of wood or other material of the type to be drilled as a dummy workpiece or template T. This can be, for example, a piece of scrap wood or any alternative piece having a flat edge. The operator draws a vertical line D transversely across template T using a T-square or analogous tool. The operator then engages a flat edge of template T against table 18 so that the template T extends across the center of the table. The laser modules are rotated such that the projected laser lines 200 and 202 from the respective modules extend across the center of the table and over the template T. The operator then adjusts the generally vertical segments of lines 200 and 202 extending transversely across the face of template piece T so that each of those lines is parallel to vertical line D, which is perpendicular to the table. The vertical line segments of laser line 200 and 202 are adjusted to be parallel to line D by operating the respective set screws 122 of modules 50, 52 in the manner previously described to pivot saddles 92 and accommodated laser elements 98 so that the respective laser lines that the modules project are oriented parallel to vertical marking D. When the vertical segments of laser lines 200 and 202 are parallel to D, this indicates that the planar laser beams are being projected perpendicularly onto the table and that the Z-axis alignment of the projected laser lines is accurate.

Template piece T is then placed face down on table 18 and held so that it does not move. A small drill bit is properly secured in drill chuck 22 and the drill press is lowered without operating the drill to make a small indent E in the upper face of template T. Laser modules 50 and 52 are then rotated so that respectively projected laser lines 200 and 202 intersect at point E of template piece T. The intersecting point or center of the laser crosshair CH is thereby axially aligned with drill bit 24 and the correct alignment in the XY-plane of the target surface is set.

Figure 13:
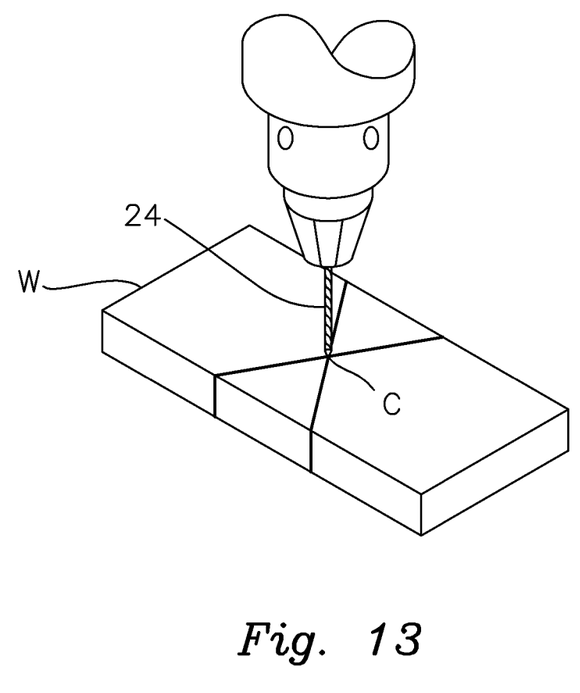
FIG. 13 is an upper perspective view of a workpiece being positioned so that the previously adjusted laser crosshair accurately is used to position the workpiece to be drilled so that a properly positioned drill hole can be formed by the drill bit at a desired position on the workpiece as aligned with the center of the laser crosshair.

After the crosshair is set, the operator removes template T and can then quickly, accurately and reliably perform necessary drilling operations. A properly sized drill bit 24 is installed. As shown in FIG. 13, workpiece W is placed on the drill press table with the spot to be drilled lightly marked by a pencil or other marker. The marked drilling target spot is aligned with the center of the crosshairs CH and the drill, which is axially aligned with point C forms a hole accurately at the desired and marked location of workpiece W. The operator does not have to undertake tedious and time consuming intermittent process of checking, adjusting, inspecting, re-checking and readjusting in order to obtain the proper laser alignment for performing the drilling operation. Device 10 virtually automatically provides for reliable, accurate alignment so that the operator is sure that the drill bit will engage the wood at the precise spot indicated by the center of the laser crosshairs.

The sturdy and secure interengagement provided by the support posts and adjustable hose clamp interengaged with the drill press column enables the laser alignment device to maintain an improved, accurate alignment with the drill bit even over prolonged use and during heavy use. The sturdy interengagement resists even substantial vibrations encountered during operation of the machine without significant disruption or movement of the crosshair, which would otherwise have to be corrected to regain accurate alignment between the drill bit and the center of the laser crosshairs. This invention significantly reduces this wasted time and inconvenience.

The adjustable length strap and cylindrical support posts positioned at respective ends of the concave recess of the plate enables device 10 to be attached to and used effectively with virtually all makes and models of drill presses. Drill presses that lack a laser alignment system or machines requiring repair or replacement of an existing laser system can be quickly and easily retrofit with the add-on or aftermarket attachment of this invention in accordance with the above-described manner of installing the device.

The secure perpendicular orientation of mounting plate 30 further enables the laser modules to be remain accurately positioned and oriented so that their emitted laser beams are close to, if not precisely, parallel to the axis of the drill bit and likewise closely or precisely perpendicular to the plane of the table even before the XY-plane and Z-axis adjustments are made. The overall adjustment process is thereby facilitated. The added feature of applicant's unique pivoting saddle structure enables the laser beams to be conveniently and quickly fine tuned and brought into proper alignment in the event that the beams are not adequately aligned by the mounting plate and support posts themselves. The Z-plane adjustment capability of device 10 enables proper alignment to be achieved quickly, conveniently and without requiring the operator to perform tedious and time consuming intermittent adjustments. The adjustable clamp allows device 10 to be quickly and conveniently removed from the column of the drill press and used with an entirely different machine, if desired. The device is therefore extremely versatile. The alignment device may be used beneficially as described above by both professional and nonprofessional drill press operators alike.

From the foregoing it may be seen that the apparatus of this invention provides for a laser alignment device for attaching to a drill press. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A laser alignment device for use on a drill press, which drill press includes a workpiece supportive table, a vertical column that supports a drill head and a drill bit operated by the drill head above the table, said device comprising:
   a base attachable to the column of the drill press above the table;
   a plurality of support posts carried by said base for engaging the column of the drill press when said base is attached to the column to fixedly orient said base relative to the table of the drill press; and
   a pair of laser modules mounted rotatably to said base, each said laser module including a laser element that is supported to pivot about an axis transverse to an axis of rotation of said laser module for producing a substantially planar laser beam, which is projected substantially perpendicularly against a target surface defined at least one of the table of the drill press and, a workpiece positioned thereon such that said beam appears as a laser line on the target surface, said laser modules being selectively rotated and said laser elements being pivotally adjusted to form a laser alignment crosshair marking on the target surface wherein said laser lines projected by said respective laser modules intersect at a point operatively aligned with an axis of the drill bit, whereby said laser alignment crosshair marking forms a drilling target for accurately positioning a workpiece to be drilled on the table below the drill bit.

2. The device of claim 1 further including a battery housing attached to said base for accommodating batteries that are operatively connected and provide power to said laser modules.

3. The device of claim 1 in which each said laser element is pivotable to angularly adjust the Z-plane of the light beam projected therefrom.

4. A laser alignment device for use on a drill press, which drill press includes a workpiece supportive table and a vertical column that supports a drill head and a drill bit operated by the drill head above the table, said device comprising:
   a base removably attachable to and directly touching the column of the drill press above and behind the table;
   a plurality of generally cylindrical support posts carried by said base for directly touching the column of the drill press when the base is attached to the column, each cylindrical support post being oriented such that a longitudinal axis of the support post is generally parallel to a longitudinal axis of the column and perpendicular to a plane of the table of the drill press to fixedly orient said base relative to the table; and a pair of laser modules rotatably mounted to and depending and pointing downwardly from said base, each said laser module for producing a substantially planar laser beam, which is projected substantially perpendicularly against a target structure defined by at least one of the table of the drill press and a workpiece positioned thereon such that said beam appears as a laser line on the target surface, said laser modules being rotated to form a laser alignment crosshair marking on the target surface wherein said laser lines projected by said respective laser modules intersect at a point operatively aligned with an axis of the drill bit, whereby said laser alignment crosshair marking forms a target for accurately positioning a workpiece to be drilled on the table below the drill bit.

5. The device of claim 4 in which said base includes a rigid plate.

6. The device of claim 5 in which said plate includes a concave recess for receiving and contiguously engaging the column of the drill press when said base is attached to the column.

7. The device of claim 5 in which said support post includes a cylindrical component attached and extending perpendicularly to said plate.

8. The device of claim 7 further including a damp for attaching said plate to the column, said clamp having an elongate, length adjustable strap for encircling the column of the drill press and circumferentially engaging said support posts.

9. The device of claim 8 in which said strap attaches to itself and said damp includes a device for adjusting the length of said strap to selectively tighten said strap when said strap encircles said column and circumferentially engages said support posts, whereby said base is attached to the column.

10. The device of claim 8 in which each cylindrical component includes a circumferential recess for receiving said strap whereby said strap securely interengages said cylindrical components.

11. The device of claim 7 in which said plate includes a concave recess for receiving and contiguous engaging the column of the drill press when said base is attached to the column, each cylindrical component being attached to said plate adjacent a respective end of said recess.

12. A laser alignment device for use on a drill press, which drill press includes a workpiece supportive table, a vertical column that supports a drill head and a drill bit operated by the drill head above the table, said device comprising:

base attachable to the column of the drill press above the table;

a plurality of support posts carried by said base for engaging the column of the drill press when said base is attached to the column to fixedly orient said base relative to the table of the drill press; and a pair of laser modules mounted rotatably to said base, each said laser module for producing a substantially planar laser beam, which is projected substantially perpendicularly against a target surface defined at least one of the table of the drill press and a workplace positioned thereon such that said beam appears as a laser line on the target surface, said laser modules being selectively rotated to form a laser alignment crosshair marking on the target surface wherein said laser lines projected by said respective laser modules, intersect at a point operatively aligned with an axis of the drill bit, whereby said laser alignment crosshair marking forms a drilling target for accurately positioning a workpiece to be drilled on the table below the drill bit; each said laser module including an outer boss mounted rotatably in a corresponding vertical opening formed through said base, said boss having a central channel formed therethrough for accommodating a laser element therein said laser element further including a saddle pivotally mounted in said central channel of said boss and having an interior chamber for holding said laser element, said central channel of said boss and said saddle having a clearance gap therebetween for permitting said saddle to pivot within said central channel, said boss and said saddle having respective bottom ends that define a light discharge opening for projecting said planar beam of light therefrom.

13. The device of claim 12 in which a lower end of said saddle extends through a bottom of said boss and a narrow window slot is formed through said lower end of said saddle for projecting said planar laser beam from said laser module.

14. The device of claim 12 in which said laser module includes laterally opposing first and second components, each in communication with said central channel of said boss for respectively receiving a saddle adjustment element and a spring, an inner end of said saddle adjustment element engaging said saddle and said spring extending between said boss and said saddle, an outer end of said first compartment being open to provide access to an outer end of said adjustment element, whereby said saddle adjustment element is moved selectively through said first compartment to engage and pivot said saddle within said channel against said spring to adjust the angle of the saddle and laser element within said clearance gap and a resulting angle at which said laser beam is projected from said module.

15. The device of claim 14 in which said adjustment element is a set screw thread ably and operably engaged with corresponding threads formed in said first compartment.

16. The device of claim 12 in which said saddle carries a pair of opposing pivot arms that fit in corresponding support pockets formed in said boss to pivotably mount said saddle in said channel of said boss.

17. The device of claim 16 in which an upper end portion of said central channel includes an inwardly tapered opening between a top of said boss and said support pockets to facilitate introduction of said saddle into said boss and strengthen interconnection between said saddle and said boss.

18. A laser alignment device for use on a drill press, which drill press includes a workpiece supportive table, a vertical column that supports a drill head and a drill bit operated by the drill head above the table, said device comprising:

a base attachable to the column of the drill press above the table;

a plurality of support posts carried by said base for engaging the column of the drill press when said base is attached to the column to fixedly orient said base relative to the table of the drill press; and a pair of laser modules mounted rotatably to said base, each said laser module for producing a substantially planar laser beam, which is projected substantially perpendicularly against a target surface defined at least one of the table of the drill press and a workpiece positioned thereon such that said beam appears as a laser line on the target surface, said laser modules being selectively rotated to form a laser alignment crosshair marking on the target surface wherein said laser lines projected by said respective laser modules intersect at a point operatively aligned with an axis of the drill bit, whereby said laser alignment crosshair marking forms a drilling target for accurately positioning a workpiece to be drilled on the table below the drill bit; said laser module including an outer boss mounted rotatably in a corresponding vertical opening formed through said base, said boss having a central channel formed therethrough for accommodating a laser element therein, said boss further including a lower knob for rotating said boss to adjust the orientation of the laser line projected against the target surface.

19. The device of claim 18 in which said base includes a groove extending partially about and adjacent to said vertical opening in said base and said boss carries a tab received by said groove to limit rotation of said boss in said base.

\* \* \* \* \*